May 18, 1937. E. E. DRAPER 2,080,604
APPARATUS FOR MAKING STEREOSCOPIC POSITIVES FROM NEGATIVES
Original Filed April 24, 1931 3 Sheets-Sheet 1

INVENTOR.
Ernest E. Draper
BY
Harvey Lea Dodson
ATTORNEY.

May 18, 1937.  E. E. DRAPER  2,080,604
APPARATUS FOR MAKING STEREOSCOPIC POSITIVES FROM NEGATIVES
Original Filed April 24, 1931   3 Sheets-Sheet 3
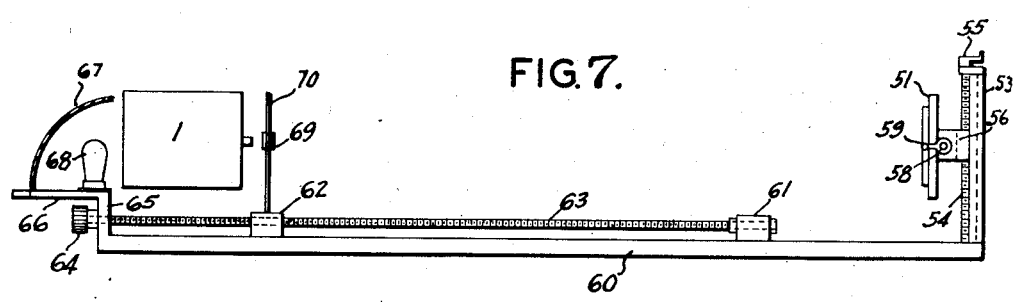
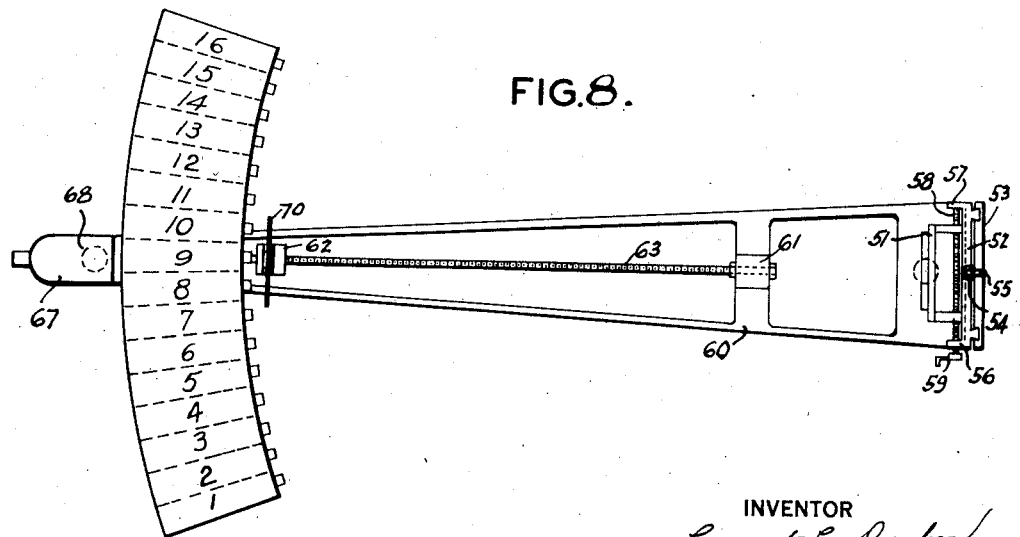

Patented May 18, 1937

2,080,604

UNITED STATES PATENT OFFICE 2,080,604

APPARATUS FOR MAKING STEREOSCOPIC POSITIVES FROM NEGATIVES

Ernest E. Draper, Scarsdale, N. Y., assignor to The Perser Corporation, New York, N. Y., a corporation of New York Original application April 24, 1931, Serial No. 532,522. Divided and this application August 30, 1934, Serial No. 742,083

20 Claims. (Cl. 88—24)

This application is a division of my application Serial No. 532,522 filed April 24, 1931 for apparatus for making stereoscopic positives from negatives.

My invention relates to that class of stereoscopic pictures termed "Depthographs", a term used to define pictures of the type taken by the Kanolt method in which a camera is swung in the arc of a circle about the object to be photographed, a screen consisting of alternate opaque and transparent lines being interposed between the plate and the object, provision being made to shift the position of the line screen in relation to the plate as the camera travels throughout the arc. The picture thus made may be viewed through a viewing line screen, in order to obtain a true stereoscopic picture. This method of taking the pictures is highly satisfactory for still life or even when regular models are used as subjects. But it requires a number of seconds for the camera to traverse its full arc, and for a person to remain still for such a long period produces a strained and unnatural expression so that suitable portraits cannot be produced. Moreover, children and animals, which cannot be held still for such a period of time, cannot be satisfactorily taken nor can out of door pictures be successfully taken by such a method for there is a certain amount of continuous motion going on, such as trees in the wind, etc., resulting in a blurred negative.

My invention has for its principal object to produce a method and apparatus for making "Depthographs" which requires an exposure under proper conditions of only a fraction of a second, thereby making possible the use of the process for portraiture, for children, out of door pictures, or animals, etc., without the slightest danger of blurring or producing unnatural expression on the part of the subject. For the purposes of illustrating apparatus for carrying out my process I have furnished the accompanying drawings which are hereunto annexed and are a part of this specification in which—

Fig. 2 is an elevation of the same apparatus.

Fig. 3 is a sectional elevation on line 3—3 of Fig. 2.

Fig. 4 is a horizontal section on line 4 of Fig. 3.

Fig. 5 is an enlarged fragmentary view showing the plate-moving means in horizontal section.

Fig. 6 is an enlarged elevation of the registering disc.

Figs. 7 and 8 show in elevation and in plan respectively, another form of my device, in which a single lens is employed.

Figure 1:
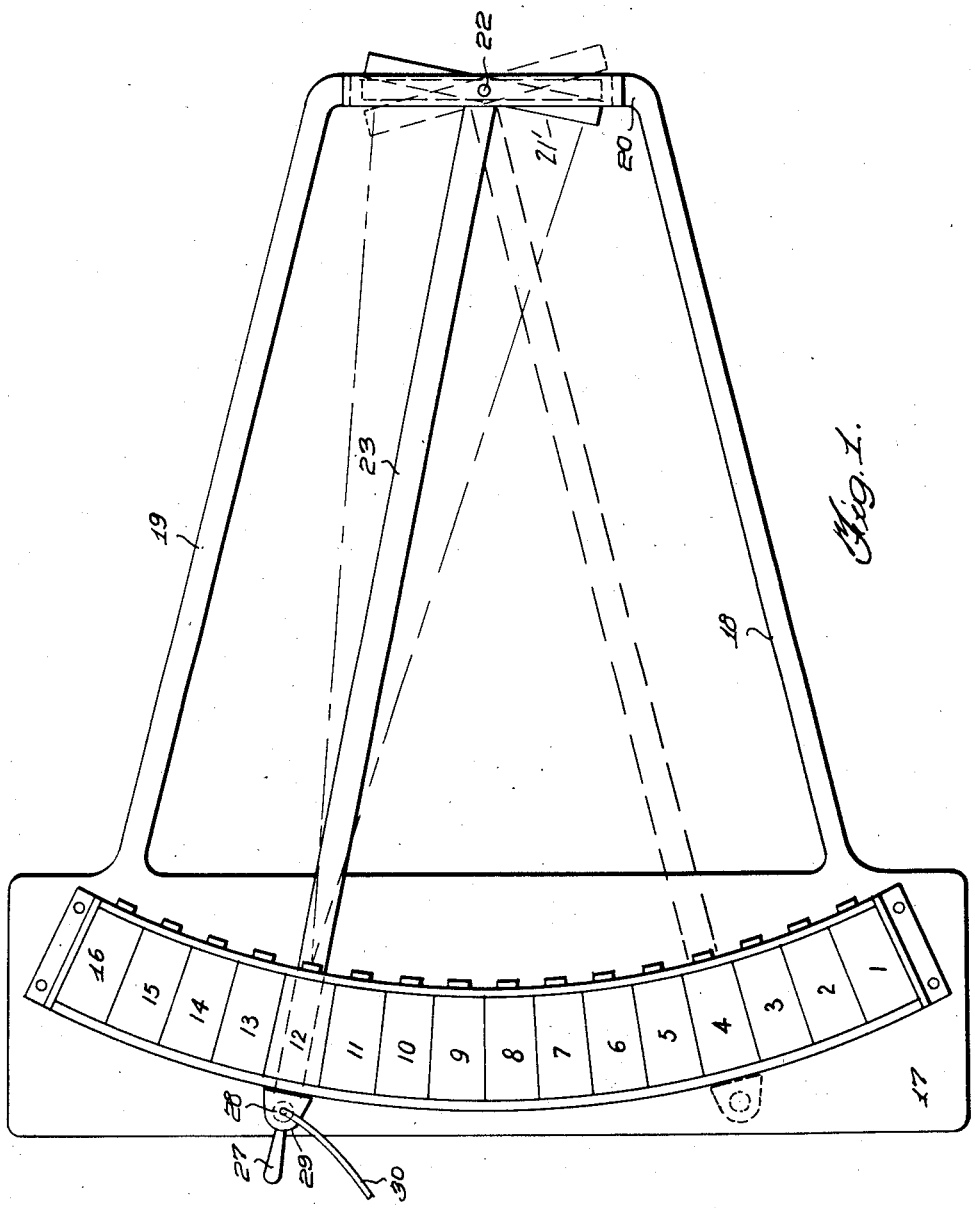
Fig. 1 is a plan view of my apparatus as a whole.

As shown in the drawings, a battery of cameras 1 to 16, capable of being used as projectors, are mounted upon a base 17, the cameras being preferably arranged in an arc of a circle as is shown. The base 17 has two arms 18 and 19 which are connected by a cross frame-like member 20. Mounted on pivots 21 and 22 in the cross member 20 is a plate holder 21', which is fixedly attached to a bar 23 and swings with it. The bar 23 extends beneath the cameras and has an upwardly extending portion 24 and a horizontal portion 25 which terminates in a handle 27 for convenient manual operation. The horizontal portion carries a light box 28 which is equipped with an electric bulb 29 connected by electric conductors 30 to a suitable source of electric current supply (not shown). The plate holder 21' has a sensitized plate 31 and a lined screen 32 comprising alternately opaque and transparent, vertical lines. The plate 31 is movable with relation to the line screen or vice versa, its movement being produced by a screw 33 mounted in one side of the frame-like member 21'. The screw 33 carries a graduated disc 35, the face of which has a number of lines corresponding to the number of projecting cameras. The pointer 34 is secured to the side of plate-holder 21' adjacent to the disc 35.

After the photographic plates have been exposed in the cameras and developed to form negatives they are returned to their original positions in the cameras and the bar 23 is swung to register with number 1 and an image of the negative is projected onto the sensitized plate 31. After negative No. 1 has been projected the screw 33 is rotated until the disc 35 moves one division, which shows that the exposed portion of the plate 31 is covered by the lined screen 32, and a new portion is opened for exposure. This process is repeated for each camera until images from all the negatives have been printed on the one plate 31. Between the exposures the movement of the plate preferably is so related to the width of the transparent vertical line and to the number of the individual exposures to be used that each resultant band of picture strips very nearly equals in width the combined width of one opaque vertical line and one transparent one. As the light box 28 is swung into position to register with the successive lenses the plate holder 21' will swing with it, thus insuring the sensitized plate 31 always being parallel to the particular negative which is being projected on to it. This contributes to the securing of correct distribution of the images on the plate.

It will be understood that the term negative, as used herein, is a relative term, the transparencies inserted in the projection cameras being negative with respect to the images formed on the sensitive plate 31, and vice versa, and that the negatives inserted in the projection cameras need not necessarily be negative with respect to the original subject matter. Thus if it is desired to make the composite picture on plate 31 negative with respect to the original subject matter, the negative inserted in the projection camera could be made positive with respect to the original subject matter, thereby accomplishing the result, or they could be made negative with respect to the original subject matter, and the resulting composite picture on plate 31 could then be reversed to give the desired result. It will also be understood that the lineating screen for exposing separate lineated areas of the sensitive surface 31 to the separate projected negatives need not necessarily be a lined screen composed of alternate opaque and transparent areas, as shown at 32 in the drawings, but may be any other similar screen for exposing only a lineated area to an impinging beam of light, such as a screen of parallel cylindrical lens elements, etc. Likewise it is obvious that in Figure 1 each projection camera could be provided with a lamp, instead of using a single lamp as shown, and these lamps could be successively lighted as the plate holder 21' is rotated to face each projector.

In Figs. 7 and 8 I show a modified form of my device. It differs from the device of Figs. 1 to 6 inclusive in employing a single movable lens 69 to perform successively the function of each of the lenses of the cameras 1 to 16 of Fig. 1, and in employing means of changing vertically and horizontally the position of the plate holder 51. Either of these modifications might be applied separately to the device of Figs. 1–6.

The plate holder 51 is mounted on a carriage 52 slidable in vertical guides formed in a plate 53, it being moved by means of a vertical screw 54 operated by a handle 55. The carriage 52 has outwardly projecting arms 56 and 57 in which is mounted a horizontal screw 58 rotatable by means of a handle 59. This screw operates to shift the plate holder 51 horizontally across the face of the vertical slide 53. I provide a base 60 which extends to the lensless cameras or negative holders 1—16, and is provided with two upwardly extending lugs 61 and 62. A screw is rotatably mounted in the lug 61 but incapable of longitudinal movement. The screw 63 is threaded in the lug 62 so that the rotation of the screw by means of the knob 64 will operate to shift the lug 62 toward or away from the cameras. The base 60 has an upwardly extending portion 65 through which the screw 63 passes and a horizontal portion 66 on which is mounted a light-box 67 in which is mounted an electric lamp bulb 68 which is connected in any suitable manner to a source of electric current (not shown).

The lenses are omitted from the cameras 1 to 16 and a single lens 69 is mounted in a carrier 70 which extends upward from the lug 62.

With this device lenses of different focal length may be used interchangeably at 69 in order to project more or less of the negative, and the lens used can be focused by turning the knob 64.

By shifting the plate holder vertically or horizontally by means of the devices described, the plate may be made to receive images from any part of the negatives.

It is obvious that certain features of the apparatus of Figs. 1–6 may be combined with features of the apparatus of Figs. 7 and 8, and that various features of the embodiments herein described may be altered or omitted without departing from the spirit and scope of the invention as defined in the following claims.

I claim:

1. In an apparatus of the class described, a projecting camera comprising a plurality of cameras adapted to hold a negative in each camera, said cameras being arranged in an arc of a circle, a light source, means to register said light source back of the lens of each camera, a sensitized plate, a line screen in front of said plate, means actuated by the shifting of the light source to maintain said plate parallel to said negative, and means to shift said plate with relation to said line screen.

2. The combination with a plurality of projecting cameras arranged in an arc of a circle, each of said projecting cameras being adapted to receive a negative, of a light source, means to register said light source back of each negative, means to hold said light source in such position, a pivoted plate holder, a sensitized plate therein, a line screen in front of said plate, means which shift said plate holder when said light source is shifted, and means to alter the relation of said plate and said line screen.

3. The combination with a plurality of projecting cameras each adapted to receive a negative, of a light source, means to locate said light source back of each negative, a sensitized plate, a lineating screen in front of said plate, means which shift said plate holder when said light source is shifted, and means to alter the relation of said plate and said lineating screen to each other.

4. The combination with a multiplicity of projectors positioned in adjacent spaced relationship and adapted to project upon a photographic plate images of a multiplicity of negatives which represent an object field as seen from different points of view of a lineating screen interposed between said photographic plate and said projectors, means of altering the positions of said photographic plate and said lineating screen relative to each other, and means for so locating the negatives in the projectors that the projected images of a particular part of the scene are made to coincide.

5. The combination with a multiplicity of projectors positioned in adjacent spaced relationship and adapted to project upon a photographic plate the image of each of a plurality of negatives which represent an object field as seen from different points of view, of a lineating screen interposed between said photographic plate and said projectors and means of altering the positions of said photographic plate and said lineating screen relative to each other.

6. The combination with a multiplicity of projectors adapted to project upon a photographic plate the image of each of a plurality of negatives, of means to maintain said photographic plate successively essentially perpendicular to the axis of projection from each projector, a lineating screen interposed between said photographic plate and said projectors, and means of altering the positions of said photographic plate and said lineating screen relative to each other.

7. The combination with a multiplicity of projectors adapted to project upon a photographic plate the image of each of a plurality of negatives, of a light source, means to locate said light source back of each of said projectors successively, means to cause the shifting of said light source to maintain said photographic plate essentially parallel to the corresponding negative, a lineating screen interposed between said photographic plate and said projectors, and means of altering the positions of said photographic plate and said lineating screen relative to each other.

8. The combination with a series of negatives each produced in one of a plurality of cameras arranged to obtain images of a single scene from different points of view, of a light source, means to locate said light source back of each of said negatives successively, a lens, a photographic plate, means to locate said lens between said photographic plate and each of said negatives successively in correspondence with the location of said light source, a lineating screen interposed between said photographic plate and said lens, and means of altering the positions of said photographic plate and said lineating screen relative to each other.

9. The combination with a series of negatives each produced in one of a plurality of cameras arranged to obtain images of a single scene from different points of view, of a photographic plate, a bar extending from said photographic plate to said negatives, a light source carried on said bar and adapted to illuminate each of said negatives successively, a lens carried on said bar and adapted to be adjustably located between said photographic plate and the illuminated negative, a lineating screen interposed between said photographic plate and said lens, and means of altering the positions of said photographic plate and said lineating screen relative to each other.

10. In an apparatus of the class described, a multiplicity of cameras positioned in adjacent spaced relationship and adapted to receive in their original positions negative pictures of a single scene produced by said cameras from different points of view and to project with the aid of a light source superimposed images of said negative pictures upon a photographic plate, a lineating screen interposed between said photographic plate and said projecting cameras, and means of altering the positions of said photographic plate and said lineating screen relative to each other.

11. The combination with a series of negative holders, of a light source, means to locate said light source back of each of said negative holders one at a time, a lens, a photographic plate, means to locate said lens between said photographic plate and each of said negative holders one at a time, in correspondence with the location of said light source, a lineating screen interposed between said photographic plate and said lens, and means of altering the positions of said photographic plate and said lineating screen relative to each other.

12. Apparatus for making a composite interlineated image from a plurality of negatives comprising a plurality of projecting cameras arranged side by side in adjacent spaced relationship, each camera being adapted to receive a negative, a photographic sensitive surface, means to successively project each negative onto said sensitive surface, the sensitive surface being in substantially the same relative position with respect to each negative as that negative is projected, a lineating screen positioned between the sensitive surface and the projecting camera, and means for moving the lineating screen and the sensitive surface relative to each other.

13. Apparatus for making a composite interlineated image from a plurality of negatives comprising a plurality of projecting cameras arranged in adjacent spaced relationship to obtain images of a single scene from different points of view, said projecting cameras being adapted to receive in their original positions developed transparencies of the images taken therein, a photographic sensitive surface, means to successively project each negative onto said sensitive surface, the sensitive surface being in substantially the same relative position with respect to each transparency as that transparency is projected, a lineating screen positioned between the sensitive surface and the projecting camera, and means for moving the lineating screen and the sensitive surface relative to each other.

14. Apparatus for making a composite interlineated image from a plurality of negatives which represent the recorded object field as seen from a corresponding number of different points of view comprising a plurality of projectors arranged side by side in adjacent spaced relationship, the projectors being adapted to receive the negatives in positions corresponding to those in which the negatives were originally exposed, means for successively projecting the said negatives onto a photographically sensitive surface, a lineating screen placed between the said sensitive surface and the projectors, and means for moving the lineating screen and sensitive surface relative to each other to expose slightly different lineating areas of the sensitive surface to different projected negatives.

15. Apparatus for making a composite interlineated image from a plurality of negatives which represent the recorded object field as seen from a corresponding number of different points of view comprising a plurality of projectors arranged side by side in adjacent spaced relationship, the projectors being adapted to receive the negatives in positions corresponding to those in which the negatives were originally exposed, means for successively projecting the said negatives onto a photographically sensitive surface, a lineating screen placed between the sensitive surface and the projectors, means for moving the lineating screen and sensitive surface relative to each other to expose slightly different lineated areas of the sensitive surface to different projected negatives, and means for changing the relative positions of the projectors and the sensitive surface so as to maintain substantially the same angular relationship between each negative and the sensitive surface when that negative is projected.

16. Apparatus for making a composite interlineated image from a plurality of negatives comprising a supporting base, a photographically sensitive surface mounted on said base, a plurality of projectors positioned in adjacent fixed relationship and containing said negatives, said projectors being movably mounted on said base, means to successively move each projector into the same relative position with respect to said sensitive surface, means to project the negative in each projector onto the sensitive surface when the projector is in the said position, and lineating means in the path of the projected rays movable with respect to the sensitive surface to expose separate lineated areas of the sensitive surface to the successively projected negatives.

17. Apparatus for making a composite interlineated image from a plurality of negatives comprising a supporting base, a holder containing a photographically sensitive surface mounted on said base, a carrier adapted to hold said negatives in adjacent fixed relationship, said carrier being movably mounted on said base, a projecting lens mounted on said base between said carrier and said photographically sensitive surface, means for moving said carrier so as to place the said negatives successively in the same cooperative relationship with said projecting lens and said sensitive surface, whereby each negative may be projected onto the sensitive surface in substantially the same position, and a lineating screen positioned in the path of the projected rays movable with respect to the sensitive surface to expose different lineated areas of the sensitive surface to the successive projected negatives.

18. Apparatus for making a composite interlineated image from a plurality of negatives which represent the recorded object field as seen from a corresponding number of different points of view comprising a supporting base, a holder containing a photographically sensitive surface mounted on said base, a carrier adapted to receive and hold the said negatives in positions corresponding to those in which the negatives were originally exposed, said carrier being mounted on said base, a projecting lens mounted on said base between said carrier and said photographically sensitive surface, means for moving said carrier so as to place the said negatives successively in the same cooperative relationship with said projecting lens and said sensitive surface, whereby each negative may be projected onto the sensitive surface in substantially the same position, and a lineating screen positioned in the path of the projected rays movable with respect to the sensitive surface to expose different lineated areas of the sensitive surface to the successive projected negatives.

19. Apparatus for making a composite interlineated image from a plurality of discrete negatives taken from slightly different viewpoints comprising means for holding said negatives side by side in fixed relationship to each other and in substantially the same relative position in which they were taken, means for successively projecting said negatives onto the same photographically sensitive surface, means for maintaining the relative position of the sensitive surface and the negative to be projected substantially the same for each negative when the negatives are in position to be projected onto the photographically sensitive surface, a lineating screen placed between the sensitive surface and the negative in position to be projected, and means for moving said lineating screen and sensitive surface relatively to each other between each successive exposure.

20. Apparatus for making a composite interlineated image from a plurality of negatives comprising a plurality of projecting cameras arranged side by side in adjacent spaced relationship, each camera being adapted to receive a negative, a photographically sensitive surface, means to successively project each negative onto said sensitive surface, the sensitive surface being substantially parallel to each negative when the negatives are in position to be projected onto the photographically sensitive surface, a lineating screen positioned between the sensitive surface and the projecting camera, and means for moving the lineating screen and the sensitive surface relative to each other.

ERNEST E. DRAPER.